(12) United States Patent
Zhang

(10) Patent No.: US 11,713,380 B2
(45) Date of Patent: Aug. 1, 2023

(54) METHOD FOR SURFACE TREATMENT OF SILICONE RUBBER

(71) Applicant: INSTITUTE OF FLEXIBLE ELECTRONICS TECHNOLOGY OF THU, ZHEJIANG, Zhejiang (CN)

(72) Inventor: Chengyu Zhang, Zhejiang (CN)

(73) Assignee: INSTITUTE OF FLEXIBLE ELECTRONICS TECHNOLOGY OF THU, ZHEJIANG, Zhejiang (CN)

( * ) Notice: Subject to any disclaimer, the term of this patent is extended or adjusted under 35 U.S.C. 154(b) by 395 days.

(21) Appl. No.: 17/035,684

(22) Filed: Sep. 29, 2020

(65) Prior Publication Data

US 2021/0017349 A1    Jan. 21, 2021

Related U.S. Application Data

(63) Continuation of application No. PCT/CN2018/121794, filed on Dec. 18, 2018.

(30) Foreign Application Priority Data

Jun. 28, 2018  (CN) .......................... 201810686792.0
Jun. 28, 2018  (CN) .......................... 201810688201.3
Jun. 28, 2018  (CN) .......................... 201810689407.8

(51) Int. Cl.
| | |
|---|---|
| C08J 7/04 | (2020.01) |
| C08J 7/043 | (2020.01) |
| C08J 7/06 | (2006.01) |
| C08J 7/12 | (2006.01) |
| C08J 7/18 | (2006.01) |
| C08K 5/19 | (2006.01) |
| C08K 5/3445 | (2006.01) |
| C08K 5/42 | (2006.01) |
| C08L 71/02 | (2006.01) |
| C08L 101/00 | (2006.01) |
| C09J 133/08 | (2006.01) |
| C09J 163/00 | (2006.01) |
| C09J 175/04 | (2006.01) |

(52) U.S. Cl.
CPC .............. *C08J 7/042* (2013.01); *C08J 7/043* (2020.01); *C08J 7/065* (2013.01); *C08J 7/123* (2013.01); *C08J 7/18* (2013.01); *C08K 5/19* (2013.01); *C08K 5/3445* (2013.01); *C08K 5/42* (2013.01); *C08L 71/02* (2013.01); *C08L 101/00* (2013.01); *C09J 133/08* (2013.01); *C09J 163/00* (2013.01); *C09J 175/04* (2013.01); *C08J 2383/05* (2013.01); *C08J 2383/06* (2013.01); *C08J 2383/08* (2013.01)

(58) Field of Classification Search
CPC ... C08J 7/042; C08J 7/043; C08J 7/065; C08J 7/123; C08J 7/18
See application file for complete search history.

(56) References Cited

U.S. PATENT DOCUMENTS

| | | | | |
|---|---|---|---|---|
| 5,439,545 | A | * | 8/1995 | Nakanishi ................ H01H 3/12 156/332 |
| 5,804,299 | A | * | 9/1998 | Nakata ..................... C08J 7/043 200/333 |
| 6,099,852 | A | * | 8/2000 | Jen .......................... C08J 7/065 351/159.01 |
| 8,163,358 | B2 | * | 4/2012 | Benrashid ........ B29D 11/00125 427/532 |
| 2007/0048349 | A1 | * | 3/2007 | Salamone ............... A61L 27/34 424/423 |
| 2008/0241557 | A1 | * | 10/2008 | Hoshi .................... C08J 7/0423 428/457 |

FOREIGN PATENT DOCUMENTS

| | | |
|---|---|---|
| CN | 1124403 | 6/1996 |
| CN | 1633459 | 6/2005 |
| CN | 101463138 | 6/2009 |
| CN | 102775762 | 11/2012 |
| CN | 108864460 A | 11/2018 |
| CN | 108929453 A | 12/2018 |
| WO | 9805269 A1 | 2/1998 |
| WO | 2007027500 A2 | 3/2007 |

OTHER PUBLICATIONS

EPO, Extended European Search Report for EP18924955, dated Mar. 2, 2022.
WIPO, ISR for PCT/CN2018/121794, Apr. 1, 2019.
Wu et al., "Effect of polydimethylsiloxane surfaces silanized with different nitrogen-containing groups on the adhesion progress of epithelial cells," Surface & Coatings Technology, 2011, vol. 205, pp. 3182-3189.
Huang et al., Review of enhancing bonding technology for the interface of silicone rubber, Chemical Engineer, 2017, summary 257, No. 2, pp. 63-65.
Wang, "Chapter 1 Polymer Paint and Composite Politics," Principle of Polymer Modification, 2018, pp. 111-116.
SIPO, First Office Action for CN Application No. 201810686792.0, dated Dec. 25, 2019.
SIPO, Second Office Action for CN Application No. 201810686792. 0, dated Jul. 8, 2020.
SIPO, First Office Action for CN Application No. 201810688201.3, dated Dec. 4, 2019.
SIPO, Third Office Action for CN Application No. 201810688201. 3, dated Jul. 20, 2020.

* cited by examiner

*Primary Examiner* — Michael P Wieczorek
(74) *Attorney, Agent, or Firm* — Hodgson Russ LLP

(57) ABSTRACT

A method for surface treatment of a silicone rubber includes: providing the silicone rubber bearing a polar group on a surface of the silicone rubber, and applying a multifunctional compound to the surface of the silicone rubber bearing the polar group to allow the multifunctional compound to react with the polar group to form a coating.

17 Claims, No Drawings

METHOD FOR SURFACE TREATMENT OF SILICONE RUBBER

CROSS-REFERENCE TO RELATED APPLICATION

This application is a continuation of International Application No. PCT/CN2018/121794, filed Dec. 18, 2018, which claims priority to Chinese Patent Application Serial Nos. 201810688201.3, 201810689407.8, and 201810686792.0, each filed Jun. 28, 2018, the entire disclosures of which are incorporated herein by reference.

FIELD

The present disclosure relates to a field of rubber technology, in particular to a method for surface treatment of a silicone rubber.

BACKGROUND

Silicone rubber can maintain a long-term elasticity at a temperature of −60° C. to 200° C. When the silicone rubber is cured, it does not absorb or release heat. Moreover, after the silicone rubber is cured, it has a small shrinkage ratio, and has excellent electrical property and chemical stability. The silicone rubber is resistant to water, ozone and weather, and has good biocompatibility and good performance. However, the surface of the silicone rubber mainly contains non-polar organic groups such as Si—O bond, Si—C bond and C—H bond, which exhibit low cohesive energy. Therefore, the silicone rubber is incompatible with other materials, has a low interaction force with other materials and a poor adhesion to other materials. On this basis, it is difficult to perform post-processing such as bonding and printing on the surface of the silicone rubber.

SUMMARY

The method for surface treatment of the silicone rubber includes: providing the silicone rubber bearing a polar group on a surface of the silicone rubber, and applying a multifunctional compound to the surface of the silicone rubber bearing the polar group to allow the multifunctional compound to react with the polar group to form a coating.

In an embodiment of the present disclosure, the polar group includes a hydroxyl group.

In an embodiment of the present disclosure, the multifunctional compound includes at least one of a silane coupling agent, a polyisocyanate and a multifunctional epoxy compound.

In an embodiment of the present disclosure, the silane coupling agent is a cationic silane coupling agent.

In an embodiment of the present disclosure, the cationic silane coupling agent has a formula (1), (2) or (3),

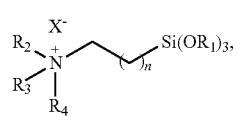 (1)

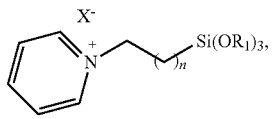 (2)

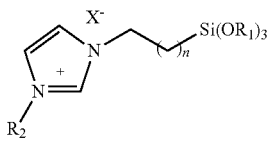 (3)

where $R_1$ is methyl, ethyl, propyl or isopropyl, $R_2$, $R_3$ and $R_4$ are each independently $C_1$-$C_{16}$ alkyl, aromatic hydrocarbyl, α-alkenyl or methacryloyloxy hydrocarbyl, $X^-$ is a halide ion, a carboxylate ion, a nitrate ion, a boron tetrafluoride ion, a phosphorus hexafluoride ion, a sulphate ion or a bis(trifluoromethanesulfonyl)imide ion, and n is an integer in a range of 0 to 3.

In an embodiment of the present disclosure, when the silane coupling agent is the cationic silane coupling agent, the method further includes: applying a hydrophilic compound to the surface of the silicone rubber bearing the polar group to allow the cationic silane coupling agent to react with the polar group and the hydrophilic compound simultaneously.

In an embodiment of the present disclosure, the hydrophilic compound includes at least one of a hydrophilic monomer and a hydrophilic polymer.

In an embodiment of the present disclosure, the hydrophilic monomer includes at least one of acrylic acids and acrylates, methacrylic acids and methacrylates, acrylamides, methacrylamides, hydroxyethyl acrylate, hydroxyethyl methacrylate, maleic acids and maleates, fumaric acids and fumarates, and a vinyl-terminated polyethylene glycol homopolymer or copolymer.

In an embodiment of the present disclosure, the hydrophilic polymer is a hydroxyl-containing hydrophilic polymer, including at least one of polyvinyl alcohol, a polyethylene glycol homopolymer or copolymer, polyhydroxyethyl acrylate, polyhydroxypropyl acrylate, poly(hydroxyethyl acrylate-co-acrylic acid), poly(hydroxyethyl acrylate-co-acrylamide), poly(hydroxyethyl acrylate-co-maleic anhydride), poly(hydroxyethyl acrylate-co-dimethylaminoethyl (meth)acrylate), poly(hydroxyethyl acrylate-co-acryloxyethyl trimethylammonium chloride), poly(hydroxypropyl acrylate-co-acrylic acid), poly(hydroxypropyl acrylate-co-acrylamide), poly(hydroxypropyl acrylate-co-maleic anhydride), poly(hydroxypropyl acrylate-co-dimethylaminoethyl (meth)acrylate), poly(hydroxypropyl acrylate-co-acryloxyethyl trimethylammonium chloride), starch, gelatin and hydroxyethyl cellulose.

In an embodiment of the present disclosure, a mass ratio of the cationic silane coupling agent to the hydrophilic compound is in a range of 5:1 to 1:5.

In an embodiment of the present disclosure, the silane coupling agent includes at least one of 3-aminopropyltriethoxysilane, γ-glycidoxypropyltrimethoxysilane, γ-(methacryloxy)-propyltrimethoxysilane, 3-(2-aminoethyl)-aminopropyltrimethoxysilane, N-aminoethyl-3-aminopropylmethyltrimethoxysilane, 3-mercaptopropyltrimethoxysilane and 3-isocyanatopropyltrimethoxysilane.

In an embodiment of the present disclosure, the polyisocyanate includes a compound containing three or more isocyanate groups.

In an embodiment of the present disclosure, the multifunctional epoxy compound includes a compound containing three or more epoxy groups.

In an embodiment of the present disclosure, after the coating is formed, the silicone rubber is kept at a temperature of 20° C. to 150° C. for 1 min to 60 min.

In an embodiment of the present disclosure, after the coating is formed, the method further includes: applying an adhesive agent on a surface of the coating to allow the adhesive agent to react with the multifunctional compound to form a second coating, and curing the coating and the second coating layer sequentially applied to the surface of the silicone rubber.

In an embodiment of the present disclosure, the adhesive agent includes a polymer or a monomer for synthesizing the polymer.

In an embodiment of the present disclosure, the polymer includes at least one of polyurethanes, epoxy resin and polyacrylates.

In an embodiment of the present disclosure, when the adhesive agent is applied to the surface of the coating, the method further includes: applying an antistatic agent to the surface of the coating so that the antistatic agent is contained in the second coating.

In an embodiment of the present disclosure, the antistatic agent includes at least one of a surfactant and a hydrophilic polymer.

In an embodiment of the present disclosure, the surfactant includes at least one of a cationic surfactant, an anionic surfactant, an amphoteric surfactant and a nonionic surfactant. The cationic surfactant includes at least one of a quaternary ammonium salt surfactant, a morpholine hydrochloride surfactant and an imidazoline surfactant. The anionic surfactant includes at least one of a sulfonate surfactant, a phosphate surfactant and a carboxylate surfactant. The nonionic surfactant includes at least one of a surfactant containing a polyoxyethylene moiety and a surfactant containing a polyol.

In an embodiment of the present disclosure, the hydrophilic polymer includes at least one of polyvinyl alcohol, a polyethylene glycol homopolymer or copolymer, polyacrylamides, polyhydroxyethyl acrylate, polyhydroxypropyl acrylate, polyacrylic acids and polyacrylates, polyacryloxyethyl trimethylammonium chloride, polydimethylaminoethyl (meth)acrylate, a maleic anhydride copolymer, a maleic copolymer, a fumaric copolymer, starch, gelatin and hydroxyethyl cellulose.

In an embodiment of the present disclosure, the surface of the silicone rubber is treated so that the silicone rubber bears the polar group.

In an embodiment of the present disclosure, the surface of the silicone rubber is treated by an ultraviolet light irradiation treatment or a plasma surface treatment. The ultraviolet light irradiation treatment is performed in an ozone atmosphere, and the plasma surface treatment is performed in an oxygen atmosphere.

In an embodiment of the present disclosure, the ultraviolet light used in the ultraviolet light irradiation treatment has a wavelength of 100 nm to 300 nm, and/or the ultraviolet light irradiation treatment is performed at a temperature of 20° C. to 200° C. for a period of 1 min to 120 min.

In an embodiment of the present disclosure, the plasma surface treatment is performed at a temperature of 20° C. to 200° C. for a period of 1 min to 120 min.

DETAILED DESCRIPTION

The present disclosure provides a method for surface treatment of a silicone rubber, to solve the problem of the poor adhesion for the silicone rubber. The method for surface treatment of the silicone rubber includes: providing the silicone rubber bearing a polar group on a surface of the silicone rubber, and applying a multifunctional compound to the surface of the silicone rubber bearing the polar group to allow the multifunctional compound to react with the polar group to form a coating.

The following beneficial effects may be achieved in the present disclosure.

First, the silicone rubber bear the polar group(s) on its surface. After applying the multifunctional compound to the surface of the silicone rubber bearing the polar group to form the continuous and dense coating, silicone oil having a low molecular weight inside the silicone rubber will not migrate to the surface of the silicone rubber, so as to maintain the surface performance of the silicone rubber.

Second, the multifunctional compound may be chemically react with the polar group(s) such as a hydroxyl group to form a stable chemical bond and improve the adhesion of the coating formed by the multifunctional compound to the surface of the silicone rubber.

Third, the multifunctional compound may chemically react with groups of other substrates or other compounds, thus improving the ability of adhering the silicone rubber to the other substrates or grafting other compounds on the surface of the coating. By mixing with an additive such as an antistatic agent, a conductive agent, an antioxidant, a plasticizer, an inorganic filler and a pigment, the surface of the silicone rubber may be modified efficiently, conveniently and widely applicably, to allow the silicone rubber to exhibit desired performances.

Fourth, the coating formed by the multifunctional compound is applied on the surface of the silicone rubber, which is beneficial for industrial applications and will not negatively affect the performance of the silicone rubber.

The method for surface treatment of the silicone rubber provided by the present disclosure will be described in detail as follows.

The method for surface treatment of the silicone rubber provided by the present disclosure includes the following operations.

In S1, the silicone rubber bearing a polar group on a surface of the silicone rubber is provided.

In S2, a multifunctional compound is applied to the surface of the silicone rubber bearing the polar group to allow the multifunctional compound to react with the polar group to form a coating.

In S1, the polar group includes a hydroxyl group. The polar group such as the hydroxyl group may be chemically reacted with the compound to improve the adhesion of the surface of the silicone rubber.

Specifically, the surface of the silicone rubber is treated so that the silicone rubber bears the polar group.

The silicone rubber may be treated in various methods, such as a solvent treatment, a coupling agent treatment, a flame treatment, an ultraviolet light irradiation treatment and a plasma surface treatment. Physical and chemical properties of the silicone rubber and the actual production requirements should be considered to select a suitable surface treatment. In this case, the surface of the silicone rubber is treated by the ultraviolet light irradiation treatment or the plasma surface treatment.

However, the efficiency of the ultraviolet light irradiation treatment for the surface of the silicone rubber is relative low. In the present disclosure, the ultraviolet light irradiation treatment is performed in an ozone atmosphere, for example, the ozone having a concentration of 1 ppm to 200 ppm. Photolysis may happen to ozone under the irradiation of ultraviolet light with a wavelength of 200 nm to 300 nm (for example, of 254 nm) to produce molecular oxygen, atomic oxygen and hydroxyl radicals. The atomic oxygen or hydroxyl radicals have strong oxidizing properties and may oxidize Si—$CH_3$ on the silicone rubber to form unstable intermediates, which further react to form carbon dioxide, water and other volatile organic compounds. Therefore, after this treatment, the silicon-methyl group (Si—$CH_3$) on organodimethylsiloxane can be oxidized as silicon-hydroxyl group (Si—OH), forming a layer of inorganic silicon dioxide, thus making the silicon rubber bear a large number of reactive polar groups such as the hydroxyl group.

The ultraviolet light has a wavelength range of 10 nm to 400 nm. The ozone can be generated in situ by the excitation of oxygen molecules by the ultraviolet light having a wavelength of 100 nm to 200 nm (for example, of 185 nm), or the ozone can be introduced through an external device. It is also feasible to introduce pure oxygen into the silicone rubber environment to increase the oxygen concentration in the environment, and the ozone can be generated in situ by the irradiation of the ultraviolet light having a wavelength of 100 nm to 200 nm. Therefore, the wavelength of the ultraviolet light in the ultraviolet light irradiation treatment is in a range of 100 nm to 300 nm.

In an embodiment of the present disclosure, the ultraviolet light irradiation treatment is performed at a temperature of 20° C. to 200° C. for a period of 1 min to 120 min, so as to make the surface of the silicone rubber to be well-treated.

Similarly, the plasma surface treatment can be performed in an oxygen atmosphere to improve the treatment efficiency. Moreover, the plasma surface treatment is performed at a temperature of 20° C. to 200° C. for a period of 1 min to 120 min.

Plasma is a non-condensed system produced by partial ionization of gas (vapor) under a certain condition, which may include neutral atoms or molecules, excited atoms or molecules, free radicals, electrons, negative ions, positive ions, and radiant photons. During the plasma surface treatment, the plasma hits the surface of the silicone rubber, and not only transfers its own energy to molecules of the surface layer of the silicone rubber, but also causes surface etching to resolve molecules of gas or other substances adsorbed on the surface. The plasma of non-polymeric and inorganic gases (such as Ar, $N_2$, $H_2$ and $O_2$) may be used for surface reactions, and excited molecules, free radicals, electronic ions and photons such as ultraviolet light generated by the plasma are involved in the surface reactions. The surface reaction may introduce specific functional groups on the surface and cause surface erosion, thus forming a cross-linked structure layer or generating the polar groups such as —COOH and —OH.

Further, a device for the ultraviolet light irradiation treatment is relatively simple, cheap, suitable for large area treatment, and has high efficiency. Therefore, the ultraviolet light irradiation treatment can be used for treating the surface of the silicone rubber, and the ultraviolet light irradiation treatment is performed in the ozone atmosphere.

Therefore, after the surface of the silicone rubber is treated, the surface not only contains hydroxyl groups, but also includes a large number of other polar groups, such as carbonyl groups and carboxyl groups, that are hydrophilic and easily react with other groups.

In fact, the layer of inorganic silicon dioxide formed on the surface of the silicone rubber after the surface treatment is not continuous, but a mixture of inorganic silicon dioxide and organosiloxane with a sea-island structure. Moreover, the layer of inorganic silicon dioxide on the surface of the treated silicone rubber is relatively thin, to have a thickness of only a few nanometers to tens of nanometers. Therefore, the silicone oil having a low molecular weight inside the silicone rubber may easily migrate to the surface of the silicone rubber, covering the layer of inorganic silicon dioxide, so that the surface layer of the silicone rubber may loss polar groups and become a hydrophobic layer.

On this basis, the multifunctional compound in S2 should be applied to the surface of the silicone rubber bearing the polar groups to form the coating.

Specifically, the multifunctional compound may be applied on the surface of the silicone rubber bearing the polar groups by spraying or coating directly, or it may be dissolved in water or an organic solvent to form a multifunctional compound solution, and then be applied on the surface of the silicone rubber bearing the polar groups by spraying or coating.

After applying the multifunctional compound to the surface of the silicone rubber bearing the polar group to form the continuous and dense coating, silicone oil having a low molecular weight inside the silicone rubber will not migrate to the surface of the silicone rubber, so as to maintain the surface performance of the silicone rubber. In addition, the multifunctional compound in the coating can chemically react with the hydroxyl group on the surface of the silicone rubber to form a stable chemical bond, thereby improving the adhesion of the coating formed by the multifunctional compound to the surface of the silicone rubber.

The multifunctional compound may also chemically react with groups of other substrates or other compounds, thus improving the ability of adhering the silicone rubber to the other substrates or grafting other compounds on the surface of the coating. By mixing with an additive such as an antistatic agent, a conductive agent, an antioxidant, a plasticizer, an inorganic filler and a pigment, the surface of the silicone rubber may be modified efficiently, conveniently and widely applicably, to allow the silicone rubber to exhibit desired performances.

In an embodiment of the present disclosure, after the coating of the multifunctional compound is formed, the silicone rubber is kept at a temperature of 20° C. to 150° C. for 1 min to 60 min, to allow the multifunctional compound of the coating to react with the polar group completely and quickly, and also to make the solvent of the coating evaporate.

In an embodiment of the present disclosure, the multifunctional compound includes at least one of a silane coupling agent, a polyisocyanate and a multifunctional epoxy compound.

In an embodiment of the present disclosure, the silane coupling agent is a cationic silane coupling agent, and the cationic silane coupling agent has a formula (1), (2) or (3),

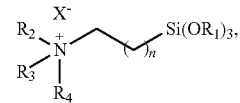

(1)

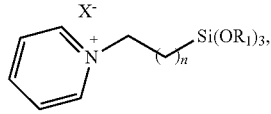

(2)

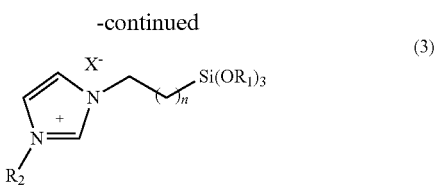

where $R_1$ is methyl, ethyl, propyl or isopropyl, $R_2$, $R_3$ and $R_4$ are each independently $C_1$-$C_{16}$ alkyl, aromatic hydrocarbyl, α-alkenyl or methacryloyloxy hydrocarbyl, $X^-$ is a halide ion, a carboxylate ion, a nitrate ion, a boron tetrafluoride ion, a phosphorus hexafluoride ion, a sulphate ion or a bis(trifluoromethanesulfonyl)imide ion, and n is an integer in a range of 0 to 3.

When $X^-$ is the halide ion, the cationic silane coupling agent is prepared according to the following process:

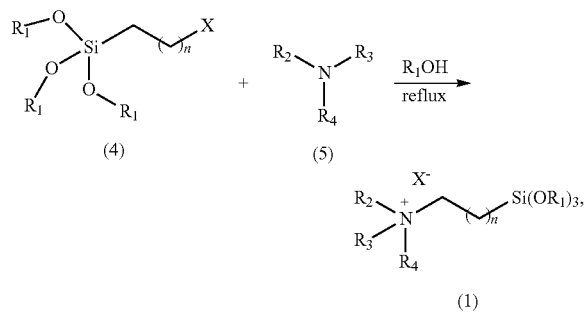

where $R_1OH$ represents an alcohol with a alkyl group $R_1$.

In the reaction, a trialkoxysilane halide of a formula (4) and an amine of a formula (5) are heated and refluxed in an alcohol solvent to generate the cationic silane coupling agent of the formula (1).

Specifically, the trialkoxysilane halide of the formula (4) includes any one of chloromethyltrimethoxysilane, 2-chloroethyltrimethoxysilane, 3-chloropropyltrimethoxysilane, 4-chlorobutyltrimethoxysilane, chloromethyltriethoxysilane, 2-chloroethyltriethoxysilane, 3-chloropropyltriethoxysilane, 4-chlorobutyltriethoxysilane, chloromethyltripropoxysilane, 2-chloroethyltripropoxysilane, 3-chloropropyltripropoxysilane, 4-chlorobutyltripropoxysilane, chloromethyltriisopropoxysilane, 2-chloroethyltriisopropoxysilane, 3-chloropropyltriisopropoxysilane, 4-chlorobutyltriisopropoxysilane, bromomethyltrimethoxysilane, 2-bromoethyltrimethoxysilane, 3-bromopropyltrimethoxysilane, 4-bromobutyltrimethoxysilane, bromomethyltriethoxysilane, 2-bromoethyltriethoxysilane, 3-bromopropyltriethoxysilane, 4-bromobutyltriethoxysilane, bromomethyltripropoxysilane, 2-bromoethyltripropoxysilane, 3-bromopropyltripropoxysilane, 4-bromobutyltripropoxysilane, bromomethyltriisopropoxysilane, 2-bromoethyltriisopropoxysilane, 3-bromopropyltriisopropoxysilane, 4-bromobutyltriisopropoxysilane.

The amine of the formula (5) includes any one of trimethylamine, triethylamine, tripropylamine, tributylamine, tripentylamine, trihexylamine, triheptylamine, trioctylamine, tridecylamine, trilaurylamine, trivinylamine, triallylamine, triphenylamine, tris(acryloxyethyl)amine, tris(methacryloxyethyl)amine, tris(acryloxypropyl)amine and tris(methacryloxypropyl)amine.

It should be understood that when the amine is pyridine, the resulting cationic silane coupling agent has the formula (2).

When the amine is N-alkylimidazole, the resulting cationic silane coupling agent has the formula (3). Specifically, N-alkylimidazole includes any one of N-methylimidazole, N-ethylimidazole, N-propylimidazole, N-isopropylimidazole and N-butylimidazole.

When $X^-$ is any one of the carboxylate ion, the nitrate ion, the boron tetrafluoride ion, the phosphorus hexafluoride ion, the sulphate ion and the bis(trifluoromethanesulfonyl)imide ion, the cationic silane coupling agent is prepared according to the following preparation process.

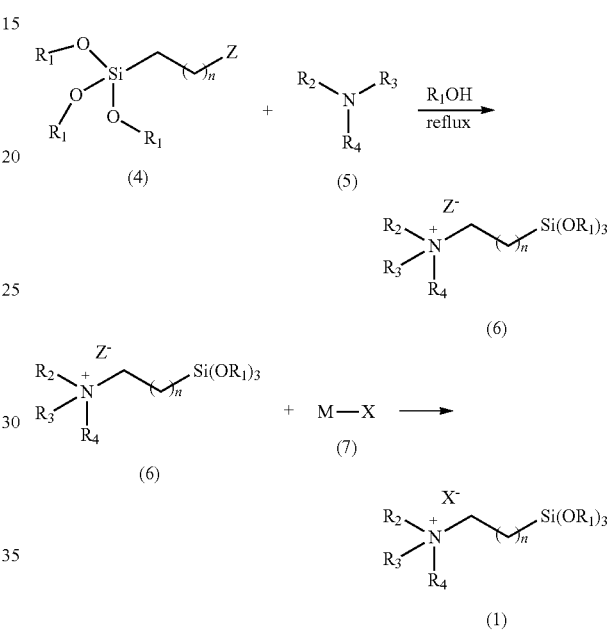

where, Z is a halogen, M is an alkali metal, $X^-$ is the carboxylate ion, the nitrate ion, the boron tetrafluoride ion, the phosphorus hexafluoride ion, the sulphate ion or the bis(trifluoromethanesulfonyl)imide ion, and $R_1OH$ represents an alcohol with a alkyl group $R_1$.

After obtaining the cationic silane coupling agent where $X^-$ is the halogen ion, it is subjected to an ion exchange reaction with the alkali metal salt of a formal (7) to produce the cationic silane coupling agent where $X^-$ is any one of the carboxylate ion, the nitrate ion, the boron tetrafluoride ion, the phosphorus hexafluoride ion, the sulphate ion and the bis(trifluoromethanesulfonyl)imide ion.

Specifically, the alkali metal salt includes any one of lithium carboxylate, lithium nitrate, lithium boron tetrafluoride, lithium phosphorous hexafluoride, lithium sulphate, lithium bis(trifluoromethanesulfonyl)imide, sodium carboxylate, sodium nitrate, sodium boron tetrafluoride, sodium phosphate hexafluoride, sodium sulphate, sodium bis(trifluoromethanesulfonyl)imide, potassium carboxylate, potassium nitrate, potassium boron tetrafluoride, potassium phosphate hexafluoride, potassium sulphate and potassium bis(trifluoromethanesulfonyl)imide.

A molar ratio of the alkali metal salt to the cationic silane coupling agent of the formula (6) is in a range of (1 to 1.2):1.

The solvent used in the ion exchange reaction includes at least one of alcohol, acetone, ethyl acetate, tetrahydrofuran and diethyl ether. The reaction is performed at temperature of 10° C. to 30° C. for a reaction period of 0.5 h to 2 h.

After the reaction, the solvent and the produced inorganic salt are removed from the reaction solution to obtain the cationic silane coupling agent. Specifically, if the inorganic salt is precipitated in the resulting reaction solution, the reaction solution is filtered to remove the precipitated inorganic salt. Then, unit operations such as concentration, filtration and extraction are appropriately combined to separate the cationic silane coupling agent. If the inorganic salt is not precipitated in the resulting reaction solution, the reaction solution is concentrated to precipitate the inorganic salt, and then the inorganic salt is removed by filtration. After this, the unit operations such as concentration, filtration and extraction are appropriately combined to separate the cationic type silane coupling agent.

When the silane coupling agent is the cationic silane coupling agent, the method of the present disclosure further includes: applying a hydrophilic compound to the surface of the silicone rubber bearing the polar group to allow the cationic silane coupling agent to react with the polar group and the hydrophilic compound simultaneously.

Therefore, by the reaction of the cationic silane coupling agent with the polar group such as the hydroxyl group on the surface of the silicone rubber and polymerization reaction of the cationic silane coupling agent with the hydrophilic compound, a continuous and dense coating is formed on the surface of the silicone rubber. The coating not only prevents the silicone oil having a low molecular weight inside the silicone rubber from migrating to the surface of the silicone rubber, but also maintains the surface performance of the silicone rubber. Moreover, both the cationic silane coupling agent and the hydrophilic compound have an antistatic effect, so as to achieve the antistatic effect of the surface of the silicone rubber.

At the same time, the cationic silane coupling agent chemically reacts with the polar group such as the hydroxyl group on the surface of the silicone rubber to form a stable chemical bond, and the hydrophilic compound is polymerized with the cationic silane coupling agent to form a stable chemical bond. Therefore, the coating formed by the mixture of the cationic silane coupling agent and the hydrophilic compound is chemically bonded to the surface of the silicone rubber, and the bonding strength is high, which can make the surface of the silicone rubber have a permanent antistatic effect. Moreover, the coating has a thickness of several micrometers or tens of micrometers, so it will not reduce the performance of the silicone rubber while achieving the antistatic effect.

Specifically, the hydrophilic compound includes at least one of a hydrophilic monomer and a hydrophilic polymer. A silanol group produced by the hydrolysis of the cationic silane coupling agent may react with the hydrophilic polymer to form a hydrophilic coating on the surface of the silicone rubber. A double-bond containing group of the cationic silane coupling agent may be polymerized with the hydrophilic monomer under radical initiation to form the hydrophilic coating.

Specifically, the hydrophilic monomer includes at least one of acrylic acids and acrylates, methacrylic acids and methacrylates, acrylamides, methacrylamides, hydroxyethyl acrylate, hydroxyethyl methacrylate, maleic acids and maleates, fumaric acids and fumarates, and a vinyl-terminated polyethylene glycol homopolymer or copolymer. It can be understood that the vinyl-terminated polyethylene glycol homopolymer or copolymer is a polymerizable macromonomer.

The hydrophilic polymer is a hydroxyl-containing hydrophilic polymer, including at least one of polyvinyl alcohol, a polyethylene glycol homopolymer or copolymer, polyhydroxyethyl acrylate, polyhydroxypropyl acrylate, poly(hydroxyethyl acrylate-co-acrylic acid), poly(hydroxyethyl acrylate-co-acrylamide), poly(hydroxyethyl acrylate-co-maleic anhydride), poly(hydroxyethyl acrylate-co-dimethylaminoethyl (meth)acrylate), poly(hydroxyethyl acrylate-co-acryloxyethyl trimethylammonium chloride), poly(hydroxypropyl acrylate-co-acrylic acid), poly(hydroxypropyl acrylate-co-acrylamide), poly(hydroxypropyl acrylate-co-maleic anhydride), poly(hydroxypropyl acrylate-co-dimethylaminoethyl (meth)acrylate), poly(hydroxypropyl acrylate-co-acryloxyethyl trimethylammonium chloride), starch, gelatin and hydroxyethyl cellulose.

Specifically, a mass ratio of the cationic silane coupling agent to the hydrophilic compound is in a range of 5:1 to 1:5.

Specifically, the silane coupling agent has a chemical formula of Y—R—SiX$_3$, where Y is a non-hydrolytic group, which may include an alkenyl group (such as a vinyl group) and is terminated with a functional group such as —Cl, —NH$_2$, —SH,

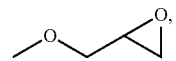

—N$_3$, —NCO and a cationic group; R is a saturated or unsaturated hydrocarbyl group; and X is a hydrolyzable group, including —Cl, —OMe, —OEt, —OC$_2$H$_4$OCH$_3$, —OSiMe$_3$. The silane coupling agent includes at least one of 3-aminopropyltriethoxysilane (KH-550), γ-glycidoxypropyltrimethoxysilane (KH-560), γ-(methacryloxy)-propyltrimethoxysilane (KH-570), 3-(2-aminoethyl)-aminopropyltrimethoxysilane (KH-792), N-aminoethyl-3-aminopropylmethyltrimethoxysilane (KH-602), 3-mercaptopropyltrimethoxysilane and 3-isocyanatopropyltrimethoxysilane.

The polyisocyanate includes a compound containing three or more isocyanate groups. Specifically, the polyisocyanate includes at least one of triphenylmethane triisocyanate, tris-(4-isocyanatophenyl)thiophosphate, toluene diisocyanate dimer, toluene diisocyanate trimer, diphenylmethane-4,4-diisocyanate, polyphenylpolymethylene polyisocyanate and an adduct of toluene diisocyanate and trimethylolpropane.

The multifunctional epoxy compound includes a compound containing three or more epoxy groups. Specifically, the multifunctional epoxy compound includes at least one of trimethylolpropane triglycidyl ether, trimethylolethane triglycidyl ether, polyglycerol triglycidyl ether, propoxyglycerol triglycidyl ether, glycerol triglycidyl ether, tetraphenylethane tetraglycidyl ether, triphenylmethane triglycidyl ether, tetraglycidyl diaminodiphenyl methane, triglycidyl p-aminophenol and tetraglycidyl m-xylene diamine.

After the coating is formed in S2, the method of the present disclosure further includes operations S3 and S4. In S3, an adhesive agent is applied on a surface of the coating to allow the adhesive agent to react with the multifunctional compound to form a second coating. In S4, the coating and the second coating layer sequentially applied to the surface of the silicone rubber are cured.

In S3, the adhesive agent is coated on the surface of the coating to make the adhesive agent to chemically react with the multifunctional compound in the coating, so that an adhesive layer can be formed on the surface of the coating to improve the adhesion of the surface of the silicone rubber efficiently, conveniently and widely applicably, thus improving the adhesive property of the silicone rubber.

Specifically, the adhesive agent may be any suitable agent which can react with the multifunctional compound to form a chemical bond. The adhesive agent includes a polymer or a monomer forming the polymer. The polymer includes at least one of at least one of polyurethanes, epoxy resin and polyacrylates.

Specifically, the polyurethane or the monomer forming the polyurethane contains a group such as —OH and —NCO that may chemically react with the functional group of the multifunctional coating on the surface of the silicone rubber to form a stable chemical bond. The epoxy resin contains an epoxy group and a hydroxyl group, which can chemically react with the functional group of the multifunctional coating. The polyacrylate containing the double bond can be copolymerized with the multifunctional compound containing the double bond. For example, the epoxy group of the multifunctional coating can react with the hydroxyl, amino, isocyanate or carboxyl group of the adhesive layer. The amino group of the multifunctional coating can react with the epoxy group, the isocyanate group, the double bond or the carboxyl group. The double bond of the multifunctional coating can chemically react with the amino group or the double bond of the adhesive layer. The sulfydryl group of the multifunctional coating can chemically react with the double bond, the isocyanate group, the carboxyl group or the epoxy group of the adhesive layer.

In an embodiment of the present disclosure, a mixture of an isocyanate, a polyol, a chain extender, a crosslinking agent, a catalyst and an auxiliary agent as raw materials for preparing the polyurethane, or the polyurethane, as the adhesive agent, is coated or sprayed on the surface of the first coating. The multifunctional compound of the first coating contains at least one of an epoxy group, an amino group, a sulfydryl group and an isocyanate group, and the adhesive agent reacts with the multifunctional compound to form a stable chemical bond.

In an embodiment of the present disclosure, a mixture of an epoxy resin monomer, a curing agent and an auxiliary agent as raw materials, or the epoxy resin, as the adhesive agent, is coated or sprayed on the surface of the first coating. The multifunctional compound of the first coating contains at least one of an epoxy group, an amino group, a sulfydryl group and an isocyanate group, and the adhesive agent reacts with the multifunctional compound to form a stable chemical bond.

In an embodiment of the present disclosure, a mixture of an acrylate monomer, an initiator, a crosslinking agent and an auxiliary agent, or the polyacrylate resin, as the adhesive agent is coated or sprayed on the surface of the first coating. The multifunctional compound of the first coating contains at least one of a double bond, a sulfydryl group, an epoxy group and an isocyanate group, and the adhesive agent reacts with the multifunctional compound to form a stable chemical bond.

When a polymer such as a polyester, a polyacrylate, a polyurethane terminated with a double-bond and a radical initiator or a photoinitiator are used as the adhesive agent, the multifunctional compound of the first coating contains the double bond. With heating or ultraviolet light irradiation, the adhesive agent and the multifunctional compound react to form a stable chemical bond.

In an embodiment of the present disclosure, when the adhesive agent is applied to the surface of the coating, the method of the present disclosure further includes: applying an antistatic agent to the surface of the coating so that the antistatic agent is contained in the second coating.

Specifically, the antistatic agent may be any suitable agent, which has good compatibility with the adhesive agent, including a surfactant, a hydrophilic polymer, an inorganic salt, an ionic liquid, a carbon black, a metal and a metal oxide. The antistatic agent includes at least one of a surfactant and a hydrophilic polymer.

When a surfactant is used as the antistatic agent, after being mixed with the adhesive agent to form the second coating, molecules of the antistatic agent will migrate outwardly to form an antistatic layer. A lipophilic group of the antistatic molecule is planted in the adhesive, and a hydrophilic group is oriented to the air. The lipophilic group makes the antistatic agent and the adhesive agent maintain a certain compatibility, and the hydrophilic group absorbs water molecules in the air to form a uniformly distributed conductive solution on the surface of the second coating, or is self-ionized to transmit surface charges to achieve the antistatic effect. When the surface antistatic layer is missing or damaged, the internal antistatic agent molecules can continue to migrate outwardly for supplement, so as to achieve a continuous antistatic effect.

In an embodiment of the present disclosure, the surfactant includes at least one of a cationic surfactant, an anionic surfactant, an amphoteric surfactant and a nonionic surfactant. Specifically, the cationic surfactant includes at least one of a quaternary ammonium salt surfactant, a morpholine hydrochloride surfactant and an imidazoline surfactant; the anionic surfactant includes at least one of a sulfonate surfactant, a phosphate surfactant and a carboxylate surfactant; the nonionic surfactant includes at least one of a surfactant containing a polyoxyethylene moiety and a surfactant containing a polyol.

Further, when the surfactant is the nonionic surfactant, the nonionic surfactant includes at least one of a surfactant containing a polyoxyethylene moiety and a surfactant containing a polyol.

When the hydrophilic polymer is used as the antistatic agent, it is alloyed with the adhesive agent, so as to achieve a permanent antistatic effect.

In an embodiment of the present disclosure, the hydrophilic polymer may be polyvinyl alcohol, polyethylene glycol homopolymer or copolymer, polyacrylamide, polyhydroxyethyl acrylate, polyhydroxypropyl acrylate, polyacrylic acid or polyacrylate, polyacryloxyethyl trimethylammonium chloride, polydimethylaminoethyl (meth)acrylate, maleic anhydride copolymer, maleic copolymer, fumaric copolymer, starch, gelatin, hydroxyethyl cellulose or any polymer containing at least one of the above polymer moieties.

Therefore, by selecting a colorless and transparent antistatic agent and a colorless and transparent adhesive with good compatibility, a colorless and transparent antistatic coating can be formed on the surface of the silicone rubber to obtain a colorless and transparent antistatic silicone rubber.

Therefore, the treated silicone rubber of the present disclosure can be applied to sealing protection of electrical appliances, electronic products, vehicles, precision instruments, improving the adhesion between the silicone rubber and the substrate, and preventing moisture from passing through a slit between the silicone rubber and the substrate to the inside of the product which may cause corrosion and insulation failure. Moreover, the treated silicone rubber of the present disclosure may be used to prepare antistatic silicone shoes, mobile phone shells, sealing rings, rubber rollers and buttons.

The method for surface treatment of the silicone rubber will be further described with references to the following specific examples.

Example 1

A sample sheet of a silicone rubber was placed in an ultraviolet ozone cleaning machine, and a temperature of the ultraviolet ozone cleaning machine was 25° C. During the ultraviolet light irradiation, a wavelength of ultraviolet light was in a range of 100 nm to 300 nm. The sample sheet was irradiated for 30 min to generate ozone by the excitation of the ultraviolet light, thereby obtaining a sample sheet A1 of surface-treated silicone rubber.

A solution of 1 part of 3-aminopropyltriethoxysilane, 5 parts of water and 94 parts of ethanol was prepared and sprayed to a surface of the sample sheet A1 of the surface-treated silicone rubber. The spray amount of the solution was 0.1 g/cm². After heating at 70° C. for 3 min, a silicone rubber B1 grafted with reactive groups on its surface was obtained.

Component A and component B of an epoxy resin adhesive agent were mixed uniformly in a ratio of 3:1, and coated on the silicone rubber B1. After being cured, the sample was tested. The results are shown in Table 1.

Example 2

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min to generate ozone by the excitation of the ultraviolet light, thereby obtaining a sample sheet A2 of surface-treated silicone rubber.

A solution of 1 part of γ-glycidoxypropyltrimethoxysilane, 5 parts of water and 94 parts of ethanol was prepared and sprayed to a surface of the sample sheet A2 of the surface-treated silicone rubber. After heating at 70° C. for 3 min, a silicone rubber B2 grafted with reactive groups on its surface was obtained.

Component A and component B of an epoxy resin adhesive agent were mixed uniformly in a ratio of 3:1, and coated on the silicone rubber B2. After being cured at 120° C. for 1 min, the sample was tested. The results are shown in Table 1.

Example 3

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. Ozone having a concentration of 1 ppm was added into the ultraviolet ozone cleaning machine. The sample sheet was irradiated for 60 min, thereby obtaining a sample sheet A3 of surface-treated silicone rubber.

A solution of 1 part of N-aminoethyl-3-aminopropylmethyltrimethoxysilane, 5 parts of water and 94 parts of ethanol was prepared and sprayed to a surface of the sample sheet A3 of the surface-treated silicone rubber. After heating at 70° C. for 3 min, a silicone rubber B3 grafted with reactive groups on its surface was obtained.

A solution mixture of diisocyanate, a polyether polyol and a catalyst was coated as a layer on the silicone rubber B3. After being cured, the sample was tested. The results are shown in Table 1.

Example 4

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. Ozone having a concentration of 100 ppm was added into the ultraviolet ozone cleaning machine. The sample sheet was irradiated for 120 min, thereby obtaining a sample sheet A4 of surface-treated silicone rubber.

Triphenylmethane triisocyanate was sprayed to a surface of the sample sheet A4 of the surface-treated silicone rubber. After heating at 70° C. for 3 min, a silicone rubber B4 grafted with reactive groups on its surface was obtained.

A solution mixture of diisocyanate, a polyether polyol and a catalyst was coated as a layer on the silicone rubber B4. After being cured at 60° C. for 30 min, the sample was tested. The results are shown in Table 1.

Example 5

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A5 of surface-treated silicone rubber.

A sealing emulsion of toluene diisocyanate-trimethylolpropane was sprayed to a surface of the sample sheet A5 of the surface-treated silicone rubber. After heating at 70° C. for 3 min, a silicone rubber B5 grafted with isocyanate groups on its surface was obtained.

A waterborne polyurethane pre-emulsion was added with a leveling agent and a thickening agent, mixed uniformly, and coated on a surface of the silicone rubber B5. After being cured at 120° C. for 3 min, the sample was tested. The results are shown in Table 1.

Example 6

A sample sheet of a silicone rubber was placed in an ultraviolet ozone cleaning machine, and a temperature of the ultraviolet ozone cleaning machine was 50° C. Pure oxygen was added in the ultraviolet ozone cleaning machine, and during the ultraviolet light irradiation, a wavelength of ultraviolet light was in a range of 100 nm to 300 nm. The sample sheet was irradiated for 10 min to generate ozone by the excitation of the ultraviolet light, thereby obtaining a sample sheet A6 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A6 of the surface-treated silicone rubber. The spray amount of the solution was 0.2 g/cm². A silicone rubber B6 grafted with isocyanate groups on its surface was obtained.

A solution mixture of an acrylate group-terminated polyurethane and a photoinitiator was coated on a surface of silicone rubber B6. After being cured by the ultraviolet light at 20° C. for 10 min, the sample was tested. The results are shown in Table 1.

Example 7

A sample sheet of a silicone rubber was placed in an ultraviolet ozone cleaning machine, and a temperature of the ultraviolet ozone cleaning machine was 50° C. During the ultraviolet light irradiation, a wavelength of ultraviolet light was in a range of 100 nm to 300 nm. Ozone having a concentration of 200 ppm was added into the ultraviolet ozone cleaning machine. The sample sheet was irradiated for 10 min, thereby obtaining a sample sheet A7 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A7 of the surface-treated silicone rubber. The spray amount of the solution was 0.2 g/cm$^2$. A silicone rubber B7 grafted with isocyanate groups on its surface was obtained.

A solution mixture of acrylic acid, an acrylate, a cross-linking agent and an initiator of azobisisobutyronitrile was coated on a surface of the silicone rubber B7. After being cured at 70° C., the sample was tested. The results are shown in Table 1.

Example 8

A sample sheet of a silicone rubber was placed in an ultraviolet ozone cleaning machine, and a temperature of the ultraviolet ozone cleaning machine was 200° C. During the ultraviolet light irradiation, a wavelength of ultraviolet light was in a range of 100 nm to 300 nm. Ozone having a concentration of 100 ppm was added into the ultraviolet ozone cleaning machine. The sample sheet was irradiated for 1 min, thereby obtaining a sample sheet A8 of surface-treated silicone rubber.

A solution of 1 part of 3-aminopropyltriethoxysilane, 5 parts of water and 94 parts of ethanol was prepared and sprayed to a surface of the sample sheet A8 of the surface-treated silicone rubber. The spray amount of the solution was 0.1 g/cm$^2$. After heating at 150° C. for 1 min, a silicone rubber B8 grafted with reactive groups on its surface was obtained.

Component A and component B of an epoxy resin adhesive agent were mixed in a ratio of 3:1, and a catalyst was added and mixed uniformly. The mixture was coated on the silicone rubber B8. After being cured at 20° C. for 60 min, the sample was tested. The results are shown in Table 1.

Example 9

A sample sheet of a silicone rubber was placed in a plasma treatment machine introduced with pure oxygen. The sample sheet was treated at 20° C. for 120 min, thereby obtaining a sample sheet A9 of surface-treated silicone rubber.

A solution of 1 part of 3-(2-aminoethyl)-aminopropyltrimethoxysilane (KH-792), 5 parts of water and 94 parts of ethanol was prepared and sprayed to a surface of the sample sheet A9 of the surface-treated silicone rubber. The spray amount of the solution was 0.1 g/cm$^2$. After heating at 70° C. for 3 min, a silicone rubber B9 grafted with reactive groups on its surface was obtained.

Component A and component B of an epoxy resin adhesive agent were uniformly mixed in a ratio of 3:1, and coated on the silicone rubber B9. After being cured at 20° C. for 60 min, the sample was tested. The results are shown in Table 1.

Example 10

A sample sheet of a silicone rubber was placed in a plasma treatment machine introduced with pure oxygen. The sample sheet was treated at 60° C. for 60 min, thereby obtaining a sample sheet A10 of surface-treated silicone rubber.

A toluene diisocyanate trimer solution was sprayed to a surface of the sample sheet A10 of the surface-treated silicone rubber. The spray amount of the solution was 0.1 g/cm$^2$. After heating at 70° C. for 3 min, a silicone rubber B10 grafted with reactive groups on its surface was obtained.

Polyurethane prepolymer was coated on the silicone rubber B10. After being cured at 20° C. for 60 min, the sample was tested. The results are shown in Table 1.

Example 11

A sample sheet of a silicone rubber was placed in a plasma treatment machine introduced with pure oxygen. The sample sheet was treated at 120° C. for 1 min, thereby obtaining a sample sheet A11 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A11 of the surface-treated silicone rubber. The spray amount of the solution was 0.2 g/cm$^2$. A silicone rubber B11 grafted with isocyanate groups on its surface was obtained.

An acrylate group-terminated polyurethane resin was mixed with a photoinitiator to coat on a surface of silicone rubber B11. After being cured by the ultraviolet light, the sample was tested. The results are shown in Table 1.

Comparative Example 1

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. Ozone having a concentration of 100 ppm was added into the ultraviolet ozone cleaning machine. The sample sheet was irradiated for 60 min, thereby obtaining a sample sheet A12 of surface-treated silicone rubber.

Component A and component B of an epoxy resin adhesive agent were mixed in a ratio of 3:1, and coated on the silicone rubber A12. After being cured, the sample was tested. The results are shown in Table 1.

Comparative Example 2

A solution of 1 part of 3-aminopropyltriethoxysilane, 5 parts of water and 94 parts of ethanol was prepared and sprayed to a surface of a sample sheet A10 of an untreated silicone rubber. The spray amount of the solution was 0.1 g/cm$^2$. After heating at 70° C. for 3 min, a silicone rubber B13.

Component A and component B of an epoxy resin adhesive agent were mixed in a ratio of 3:1, and coated on the silicone rubber B13. After being cured, the sample was tested. The results are shown in Table 1.

TABLE 1

| | Peel strength (N · mm$^{-1}$) | Broken manner |
|---|---|---|
| Example 1 | >2 | silicone rubber is broken |
| Example 2 | >2 | silicone rubber is broken |
| Example 3 | >2 | silicone rubber is broken |
| Example 4 | 1.5 | interface is broken |
| Example 5 | 1.3 | interface is broken |
| Example 6 | 1.4 | interface is broken |
| Example 7 | 0.9 | interface is broken |
| Example 8 | >2 | silicone rubber is broken |
| Example 9 | >2 | silicone rubber is broken |
| Example 10 | 1.5 | interface is broken |
| Example 11 | 1.0 | interface is broken |
| Comparative example 1 | 0.1 | none |
| Comparative example 2 | 0.3 | none |

As shown in Table 1, the silicone rubbers prepared in Examples 1 to 11 show a higher adhesion than the silicone rubbers prepared in Comparative examples 1 and 2.

Example 12

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 10 min to generate ozone by the excitation of the ultraviolet light, thereby obtaining a sample sheet A14 of surface-treated silicone rubber.

A solution of 1 part of 1,1,1-trimethyl-1-[(trimethoxysilane)methyl]ammonium chloride, 1 part of polyethylene glycol (having a polymer molecular weight of 2000 g/mol), 5 parts of water and 93 parts of ethanol was prepared. Acetic acid was added to adjust the solution to have a pH of 3 to 4. The solution was sprayed to a surface of the sample sheet A14 of the surface-treated silicone rubber. The spray amount of the solution was 0.1 g/cm$^2$. After heating at 70° C. for 3 min, a silicone rubber 1 coated with an antistatic coating on its surface was obtained.

Example 13

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 30 min to generate ozone by the excitation of the ultraviolet light, thereby obtaining a sample sheet A15 of surface-treated silicone rubber.

A solution of 5 parts of 1,1,1-trimethyl-1-[(trimethoxysilane)methyl]ammonium chloride, 1 part of polyethylene glycol (having a polymer molecular weight of 2000 g/mol), 4 parts of water and 90 parts of ethanol was prepared. Acetic acid was added to adjust the solution to have a pH of 3 to 4. The solution was sprayed to a surface of the sample sheet A15 of the surface-treated silicone rubber. The spray amount of the solution was 0.1 g/cm$^2$. After heating at 70° C. for 3 min, a silicone rubber 2 coated with an antistatic coating on its surface was obtained.

Example 14

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min to generate ozone by the excitation of the ultraviolet light, thereby obtaining a sample sheet A16 of surface-treated silicone rubber.

A solution of 1 part of 1,1,1-trimethyl-1-[(trimethoxysilane)methyl]ammonium chloride, 1 part of polyethylene glycol (having a polymer molecular weight of 2000 g/mol), 5 parts of water and 93 parts of ethanol was prepared. Acetic acid was added to adjust the solution to have a pH of 3 to 4. The solution was sprayed to a surface of the sample sheet A16 of the surface-treated silicone rubber. The spray amount of the solution was 0.1 g/cm$^2$. After heating at 70° C. for 3 min, a silicone rubber 3 coated with an antistatic coating on its surface was obtained.

Example 15

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 120 min to generate ozone by the excitation of the ultraviolet light, thereby obtaining a sample sheet A17 of surface-treated silicone rubber.

A solution of 1 part of 1,1,1-trimethyl-1-[(trimethoxysilane)methyl]ammonium phosphate hexafluoride, 1 part of polyethylene glycol (having a polymer molecular weight of 2000 g/mol), 5 parts of water and 93 parts of ethanol was prepared. Acetic acid was added to adjust the solution to have a pH of 3 to 4. The solution was sprayed to a surface of the sample sheet A17 of the surface-treated silicone rubber. The spray amount of the solution was 0.1 g/cm$^2$. After heating at 70° C. for 3 min, a silicone rubber 4 coated with an antistatic coating on its surface was obtained.

Example 16

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. Ozone having a concentration of 1 ppm was added into the ultraviolet ozone cleaning machine. The sample sheet was irradiated for 60 min, thereby obtaining a sample sheet A18 of surface-treated silicone rubber.

A solution of 2 parts of 1,1,1-trimethyl-1-[(trimethoxysilane)ethyl]ammonium boron tetrafluoride, 1 part of polyhydroxyethyl acrylate (having a number-average molecular weight of 3000 mol/L), 5 parts of water and 92 parts of ethanol was prepared. Acetic acid was added to adjust the solution to have a pH of 3 to 4. The solution was sprayed to a surface of the sample sheet A18 of the surface-treated silicone rubber. The spray amount of the solution was 0.2 g/cm$^2$. After heating at 70° C. for 3 min, a silicone rubber 5 coated with an antistatic coating on its surface was obtained.

Example 17

A sample sheet of a silicone rubber was placed in an ultraviolet ozone cleaning machine, and a temperature of the ultraviolet ozone cleaning machine was 50° C. During the ultraviolet light irradiation, a wavelength of ultraviolet light was in a range of 100 nm to 300 nm. Ozone having a concentration of 100 ppm was added into the ultraviolet ozone cleaning machine. The sample sheet was irradiated for 10 min, thereby obtaining a sample sheet A19 of surface-treated silicone rubber.

A solution of 1 part of 1,1,1-trioctyl-1-[(trimethoxysilane) ethyl]ammonium acetate, 0.5 part of starch, 3.5 parts of water and 95 parts of ethanol was prepared. Acetic acid was added to adjust the solution to have a pH of 3 to 4. The solution was sprayed to a surface of the sample sheet A19 of the surface-treated silicone rubber. The spray amount of the solution was 0.2 g/cm². The solution was reacted at 20° C. for 60 min, and dried. A silicone rubber 6 coated with an antistatic coating on its surface was obtained.

Example 18

A sample sheet of a silicone rubber was placed in an ultraviolet ozone cleaning machine, and a temperature of the ultraviolet ozone cleaning machine was 100° C. During the ultraviolet light irradiation, a wavelength of ultraviolet light was in a range of 100 nm to 300 nm. Ozone having a concentration of 200 ppm was added into the ultraviolet ozone cleaning machine. The sample sheet was irradiated for 10 min, thereby obtaining a sample sheet A20 of surface-treated silicone rubber.

A solution of 1 part of 1,1,1-triethyl-1-[(trimethoxysilane) propyl]ammonium nitrate, 0.5 part of hydroxyethyl cellulose, 3.5 parts of water, 95 parts of ethanol was prepared. Acetic acid was added to adjust the solution to have a pH of 3 to 4. The solution was sprayed to a surface of the sample sheet A20 of the surface-treated silicone rubber. The spray amount of the solution was 0.05 g/cm². The solution was reacted at 150° C. for 1 min, and dried. A silicone rubber 7 coated with an antistatic coating on its surface was obtained.

Example 19

A sample sheet of a silicone rubber was placed in an ultraviolet ozone cleaning machine, and a temperature of the ultraviolet ozone cleaning machine was 200° C. During the ultraviolet light irradiation, a wavelength of ultraviolet light was in a range of 100 nm to 300 nm. Ozone having a concentration of 100 ppm was added into the ultraviolet ozone cleaning machine. The sample sheet was irradiated for 1 min, thereby obtaining a sample sheet A21 of surface-treated silicone rubber.

A solution of 1 part of 1-[(trimethoxysilane)propyl]pyridine ethyl sulphate, 0.5 part of polyethylene glycol 4000, 3.5 parts of water, 95 parts of ethanol was prepared. Acetic acid was added to adjust the solution to have a pH of 3 to 4. The solution was sprayed to a surface of the sample sheet A21 of the surface-treated silicone rubber. The spray amount of the solution was 0.05 g/cm². The solution was reacted at 60° C. for 30 min, and dried. A silicone rubber 8 coated with an antistatic coating on its surface was obtained.

Example 20

A sample sheet of a silicone rubber was placed in an ultraviolet ozone cleaning machine introduced with pure oxygen, and a temperature of the ultraviolet ozone cleaning machine was 50° C. During the ultraviolet light irradiation, a wavelength of ultraviolet light was in a range of 100 nm to 300 nm. The sample sheet was irradiated for 30 min, thereby obtaining a sample sheet A22 of surface-treated silicone rubber.

A solution of 1 part of 1-[(trimethoxysilane)propyl] ammonium bis(trifluoromethanesulfonyl)imide, 2 parts of polyethylene glycol (having a polymer molecular weight of 4000 g/mol), 3 parts of water, 94 parts of ethanol was prepared. Acetic acid was added to adjust the solution to have a pH of 3 to 4. The solution was sprayed to a surface of the sample sheet A22 of the surface-treated silicone rubber. The spray amount of the solution was 0.05 g/cm². The solution was reacted at 60° C. for 30 min. A silicone rubber 9 coated with an antistatic coating on its surface was obtained.

Example 21

A sample sheet of a silicone rubber was placed in an ultraviolet ozone cleaning machine, and a temperature of the ultraviolet ozone cleaning machine was 50° C. During the ultraviolet light irradiation, a wavelength of ultraviolet light was in a range of 100 nm to 300 nm. The sample sheet was irradiated for 30 min, thereby obtaining a sample sheet A23 of surface-treated silicone rubber.

A solution of 1 part of 1,1,1-triallyl-1-[(trimethoxysilane) propyl]ammonium nitrate, 0.5 part of sodium acrylate, 3.5 parts of water, 95 parts of ethanol and 0.005 part of a thermal initiator of azobisisobutryamide hydrochloride was prepared. Acetic acid was added to adjust the solution to have a pH of 3 to 4. The solution was sprayed to a surface of the sample sheet A23 of the surface-treated silicone rubber. The spray amount of the solution was 0.05 g/cm². The solution was reacted at 60° C. for 30 min. A silicone rubber 10 coated with an antistatic coating on its surface was obtained.

Example 22

A sample sheet of a silicone rubber was placed in a plasma treatment machine introduced with pure oxygen. The sample sheet was treated at 20° C. for 120 min, thereby obtaining a sample sheet A24 of surface-treated silicone rubber.

A solution of 1 part of 1-[(trimethoxysilane)propyl]-3-methylimidazole lithium hexafluorophosphate, 5 parts of a copolymer of polyethylene glycol and polypropylene glycol, 4 parts of water, 90 parts of ethanol was prepared. Acetic acid was added to adjust the solution to have a pH of 3 to 4. The solution was sprayed to a surface of the sample sheet A24 of the surface-treated silicone rubber. The spray amount of the solution was 0.05 g/cm². The solution was reacted at 60° C. for 30 min. A silicone rubber 11 coated with an antistatic coating on its surface was obtained.

Example 23

A sample sheet of a silicone rubber was placed in a plasma treatment machine introduced with pure oxygen. The sample sheet was treated at 60° C. for 60 min, thereby obtaining a sample sheet A25 of surface-treated silicone rubber.

A solution of 1 part of 1,1,1-tripropyl-1-[(trimethoxysilane)propyl]ammonium acetate, 1 part of methallyl polyoxyethylene ether, 4 parts of water, 94 parts of ethanol and 0.05 part of a thermal initiator of azobisisobutryamide hydrochloride was prepared. Acetic acid was added to adjust the solution to have a pH of 3 to 4. The solution was sprayed to a surface of the sample sheet A25 of the surface-treated silicone rubber. The spray amount of the solution was 0.1 g/cm². The solution was reacted at 60° C. for 30 min. A silicone rubber 12 coated with an antistatic coating on its surface was obtained.

Example 24

A sample sheet of a silicone rubber was placed in a plasma treatment machine introduced with pure oxygen. The sample sheet was treated at 120° C. for 1 min, thereby obtaining a sample sheet A26 of surface-treated silicone rubber.

A solution of 1 part of 1,1,1-trimethyl-1-[(trimethoxysilane)butyl]ammonium chloride, 0.5 part of poly(hydroxyethyl acrylate-co-acryloxyethyl trimethylammonium chloride), 3.5 parts of water, 95 parts of ethanol was prepared. Acetic acid was added to adjust the solution to have a pH of 3 to 4. The solution was sprayed to a surface of the sample sheet A26 of the surface-treated silicone rubber. The solution was reacted at 60° C. for 30 min. A silicone rubber 13 coated with an antistatic coating on its surface was obtained.

Comparative Example 3

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min to generate ozone, thereby obtaining a sample sheet 14 of surface-treated silicone rubber.

Comparative Example 4

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min to generate ozone, thereby obtaining a sample sheet B14 of surface-treated silicone rubber.

A solution of 1 part of 1,1,1-trimethyl-1-[(trimethoxysilane)methyl]ammonium chloride, 5 parts of water, 94 parts of ethanol was prepared. Acetic acid was added to adjust the solution to have a pH of 3 to 4. The solution was sprayed to a surface of the sample sheet B14 of the surface-treated silicone rubber. The spray amount of the solution was 0.1 g/cm$^2$. The solution was reacted at 70° C. for 3 min. A silicone rubber 15 coated with an antistatic coating on its surface was obtained.

Comparative Example 5

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min to generate ozone, thereby obtaining a sample sheet B15 of surface-treated silicone rubber.

A solution of 1 part of polyethylene glycol (having a polymer molecular weight of 2000 g/mol), 5 parts of water, 94 parts of ethanol was prepared. Acetic acid was added to adjust the solution to have a pH of 3 to 4. The solution was sprayed to a surface of the sample sheet B15 of the surface-treated silicone rubber. The spray amount of the solution was 0.1 g/cm$^2$. The solution was reacted at 70° C. for 3 min. A silicone rubber 16 coated with an antistatic coating on its surface was obtained.

The silicone rubber prepared in each of Example 12 to 24 and in Comparative examples 3 to 5 is tested, and the test results are shown in Table 2.

TABLE 2

| Sample | Surface resistivity (Ω/□) | Surface resistivity after 30 days (Ω/□) |
| --- | --- | --- |
| Example 12 | $2*10^{10}$ | $4*10^{10}$ |
| Example 13 | $7*10^9$ | $8*10^9$ |
| Example 14 | $5*10^8$ | $7*10^8$ |
| Example 15 | $3*10^8$ | $5*10^8$ |
| Example 16 | $3*10^9$ | $6*10^9$ |
| Example 17 | $2*10^9$ | $4*10^9$ |
| Example 18 | $8*10^8$ | $2*10^9$ |
| Example 19 | $2*10^8$ | $5*10^8$ |
| Example 20 | $4*10^7$ | $5*10^7$ |
| Example 21 | $2*10^7$ | $3*10^7$ |
| Example 22 | $2*10^8$ | $4*10^8$ |
| Example 23 | $8*10^6$ | $9*10^6$ |
| Example 24 | $3*10^8$ | $6*10^8$ |
| Comparative example 3 | $5*10^{14}$ | $6*10^{14}$ |
| Comparative example 4 | $3*10^{11}$ | $6*10^{12}$ |
| Comparative example 5 | $4*10^{11}$ | $7*10^{13}$ |

As shown in Table 2, the silicone rubbers prepared in Examples 12 to 24 are all antistatic rubbers, while the silicone rubbers prepared in Comparative examples 3 to 5 have poor antistatic properties.

Example 25

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 10 min, thereby obtaining a sample sheet A27 of surface-treated silicone rubber.

A solution of 1 part of 3-aminopropyltriethoxysilane, 5 parts of water and 94 parts of ethanol was prepared and sprayed to a surface of the sample sheet A27 of the surface-treated silicone rubber. The spray amount of the solution was 0.1 g/cm$^2$. After heating at 70° C. for 3 min, a silicone rubber B16 grafted with reactive groups on its surface was obtained.

Component A and component B of an epoxy resin adhesive agent were mixed in a ratio of 3:1, and 2 wt % of octadecyldimethyl hydroxyethyl quaternary ammonium nitrate was added and mixed uniformly. The obtained mixture was coated on the silicone rubber B16. After curing, an antistatic silicone rubber 17 was obtained.

Example 26

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A28 of surface-treated silicone rubber.

A solution of 1 part of γ-glycidoxypropyltrimethoxysilane, 5 parts of water and 94 parts of ethanol was prepared and sprayed to a surface of the sample sheet A28 of the surface-treated silicone rubber. After heating at 70° C. for 3 min, a silicone rubber B17 grafted with reactive groups on its surface was obtained.

Component A and component B of an epoxy resin adhesive agent were mixed in a ratio of 3:1, and 2 wt % of N-hexadecylpyridine nitrate was added and mixed uniformly. The obtained mixture was coated on the silicone rubber B17. After curing, an antistatic silicone rubber 18 was obtained.

Example 27

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A29 of surface-treated silicone rubber.

A solution of 1 part of N-aminoethyl-3-aminopropylmethyltrimethoxysilane, 5 parts of water and 94 parts of ethanol was prepared and sprayed to a surface of the sample sheet A29 of the surface-treated silicone rubber. After heating at 70° C. for 3 min, a silicone rubber B18 grafted with reactive groups on its surface was obtained.

2 wt % of dodecyltrimethylammonium chloride was added to a polyurethane prepolymer, and mixed uniformly. The obtained mixture was coated on the silicone rubber B18. After curing, an antistatic silicone rubber 19 was obtained.

Example 28

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A30 of surface-treated silicone rubber.

Triphenylmethane triisocyanate was sprayed to a surface of the sample sheet A30 of the surface-treated silicone rubber. After heating at 70° C. for 3 min, a silicone rubber B19 grafted with reactive groups on its surface was obtained.

2 wt % of sodium dilaurate phosphate was added to a polyurethane prepolymer, and mixed uniformly. The obtained mixture was coated on the silicone rubber B19. After curing, an antistatic silicone rubber 20 was obtained.

Example 29

A sample sheet of a silicone rubber was placed in an ultraviolet ozone cleaning machine, and a temperature of the ultraviolet ozone cleaning machine was 20° C. Pure oxygen was added in the ultraviolet ozone cleaning machine. During the ultraviolet light irradiation, a wavelength of ultraviolet light was in a range of 100 nm to 300 nm. The sample sheet was irradiated for 60 min, thereby obtaining a sample sheet A31 of surface-treated silicone rubber.

A sealing emulsion of toluene diisocyanate-trimethylolpropane was sprayed to a surface of the sample sheet A31 of the surface-treated silicone rubber. After heating at 70° C. for 3 min, a silicone rubber B20 grafted with isocyanate groups on its surface was obtained.

A waterborne polyurethane pre-emulsion was added with 2 wt % of polyethylene glycol 4000, and mixed uniformly. The obtained mixture was coated on the silicone rubber B20. After curing, an antistatic silicone rubber 21 was obtained.

Example 30

A sample sheet of a silicone rubber was placed in an ultraviolet ozone cleaning machine, and a temperature of the ultraviolet ozone cleaning machine was 50° C. Pure oxygen was added in the ultraviolet ozone cleaning machine. During the ultraviolet light irradiation, a wavelength of ultraviolet light was in a range of 100 nm to 300 nm. The sample sheet was irradiated for 10 min, thereby obtaining a sample sheet A32 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A32 of the surface-treated silicone rubber. The spray amount of the solution was 0.2 g/cm². A silicone rubber B21 grafted with isocyanate groups on its surface was obtained.

A solution mixture of an acrylate group-terminated polyurethane and a photoinitiator was coated on a surface of silicone rubber B21. After curing by the ultraviolet light, an antistatic silicone rubber 22 was obtained.

Example 31

A sample sheet of a silicone rubber was placed in an ultraviolet ozone cleaning machine, and a temperature of the ultraviolet ozone cleaning machine was 50° C. Pure oxygen was added in the ultraviolet ozone cleaning machine. During the ultraviolet light irradiation, a wavelength of ultraviolet light was in a range of 100 nm to 300 nm. The sample sheet was irradiated for 10 min, thereby obtaining a sample sheet A33 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A33 of the surface-treated silicone rubber. The spray amount of the solution was 0.2 g/cm². A silicone rubber B22 grafted with isocyanate groups on its surface was obtained.

A solution mixture of an acrylic acid, an acrylate, a crosslinking agent, an initiator of azobisisobutyronitrile and an antistatic agent of trimethylhexadecyl ammonium acetate was coated on a surface of silicone rubber B22, and heated at 70° C. for curing. An antistatic silicone rubber 23 was obtained.

Example 32

A sample sheet of a silicone rubber was placed in an ultraviolet ozone cleaning machine, and a temperature of the ultraviolet ozone cleaning machine was 20° C. Ozone having a concentration of 1 ppm was added into the ultraviolet ozone cleaning machine. During the ultraviolet light irradiation, a wavelength of ultraviolet light was in a range of 100 nm to 300 nm. The sample sheet was irradiated for 120 min, thereby obtaining a sample sheet A34 of surface-treated silicone rubber.

A solution of 1 part of tetraglycidyl diaminodiphenyl methane, 5 parts of water and 94 parts of ethanol was prepared and sprayed to a surface of the sample sheet A34 of the surface-treated silicone rubber. The spray amount of the solution was 0.2 g/cm². A silicone rubber B23 grafted with epoxy groups on its surface was obtained.

Component A and component B of an epoxy resin adhesive agent were mixed in a ratio of 3:1, and 2 wt % of N-hexadecylpyridine nitrate was added and mixed uniformly. The obtained mixture was coated on the silicone rubber B23. After curing, an antistatic silicone rubber 24 was obtained.

Example 33

A sample sheet of a silicone rubber was placed in an ultraviolet ozone cleaning machine, and a temperature of the ultraviolet ozone cleaning machine was 120° C. Ozone having a concentration of 200 ppm was added into the ultraviolet ozone cleaning machine. During the ultraviolet light irradiation, a wavelength of ultraviolet light was in a range of 100 nm to 300 nm. The sample sheet was irradiated for 1 min, thereby obtaining a sample sheet A35 of surface-treated silicone rubber.

A solution of 2 parts of 3-mercaptopropyltrimethoxysilane, 5 parts of water and 93 parts of ethanol was prepared and sprayed to a surface of the sample sheet A35 of the surface-treated silicone rubber. The spray amount of the solution was 0.2 g/cm$^2$. A silicone rubber B24 grafted with epoxy groups on its surface was obtained.

1 wt % of potassium dioctyl dithiophosphate was added to diphenylmethane diisocyanate (MDI), a polyether polyol, a catalyst, dimethylol propionic acid as an adhesive agent, mixed uniformly, and coated on the silicone rubber B24. After curing, an antistatic silicone rubber 25 is obtained.

Example 34

A sample sheet of a silicone rubber was placed in a plasma treatment machine introduced with pure oxygen. The sample sheet was treated at 20° C. for 120 min, thereby obtaining a sample sheet A36 of surface-treated silicone rubber.

A solution of 1 part of 3-(2-aminoethyl)-aminopropyltrimethoxysilane (KH-792), 5 parts of water and 94 parts of ethanol was prepared and sprayed to a surface of the sample sheet A36 of the surface-treated silicone rubber. The spray amount of the solution was 0.1 g/cm$^2$. After heating at 70° C. for 3 min, a silicone rubber B25 grafted with reactive groups on its surface was obtained.

Component A and component B of an epoxy resin adhesive agent were mixed in a ratio of 3:1, and 5 wt % of water-soluble alcohol polyoxyethylene ether-modified silicone oil was added and mixed uniformly. The obtained mixture was coated on the silicone rubber B25. After curing, an antistatic silicone rubber 26 was obtained.

Example 35

A sample sheet of a silicone rubber was placed in a plasma treatment machine introduced with pure oxygen. The sample sheet was treated at 50° C. for 60 min, thereby obtaining a sample sheet A37 of surface-treated silicone rubber.

A toluene diisocyanate trimer solution was sprayed to a surface of the sample sheet A37 of the surface-treated silicone rubber. The spray amount of the solution was 0.1 g/cm$^2$. After heating at 70° C. for 3 min, a silicone rubber B26 grafted with reactive groups on its surface was obtained.

Polyurethane prepolymer was added with 2 wt % of water-soluble alcohol polyoxyethylene ether-modified silicone oil, mixed uniformly and coated on the silicone rubber B26. After curing, an antistatic silicone rubber 27 was obtained.

Example 36

A sample sheet of a silicone rubber was placed in a plasma treatment machine introduced with pure oxygen. The sample sheet was treated at 120° C. for 1 min, thereby obtaining a sample sheet A38 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A38 of the surface-treated silicone rubber. The spray amount of the solution was 0.2 g/cm$^2$. A silicone rubber B27 grafted with isocyanate groups on its surface was obtained.

A mixture solution of an acrylate group-terminated polyurethane resin, a photoinitiator and 2 wt % of octadecyl dimethyl hydroxyethyl quaternary ammonium nitrate was coated on a surface of the silicone rubber B27. After curing by the ultraviolet light, an antistatic silicone rubber 28 was obtained.

Comparative Example 6

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet 29 of surface-treated silicone rubber.

Comparative Example 7

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A39 of surface-treated silicone rubber.

A solution of 1 part of γ-(methacryloxy)-propyltrimethoxysilane, 5 parts of water and 94 parts of ethanol was prepared. Acetic acid was added to adjust the solution to have a pH of 3 to 4. The solution was sprayed to a surface of the sample sheet A39 of the surface-treated silicone rubber. The spray amount of the solution was 0.1 g/cm$^2$. After heating at 70° C. for 3 min, a surface-coated silicone rubber 30 was obtained.

Comparative Example 8

A sample sheet of a silicone rubber was placed in an ultraviolet ozone cleaning machine, and a temperature of the ultraviolet ozone cleaning machine was 20° C. During the ultraviolet light irradiation, a wavelength of ultraviolet light was in a range of 100 nm to 300 nm. The sample sheet was irradiated for 60 min, thereby obtaining a sample sheet A40 of surface-treated silicone rubber.

A solution of 1 part of 3-aminopropyltriethoxysilane, 5 parts of water and 94 parts of ethanol was prepared and sprayed to a surface of the sample sheet A40 of the surface-treated silicone rubber. The spray amount of the solution was 0.1 g/cm$^2$. After heating at 70° C. for 3 min, a silicone rubber B28 grafted with reactive groups on its surface was obtained.

Component A and component B of an epoxy resin adhesive agent were mixed in a ratio of 3:1, and coated on the silicone rubber B28. After curing, a silicone rubber 31 was obtained.

The silicone rubber prepared in each of Example 25 to 36 and in Comparative examples 6 to 7 is tested, and the test results are shown in Table 3.

TABLE 3

| | Surface resistivity ($\Omega/\square$) | Surface resistivity after 30 days ($\Omega/\square$) |
|---|---|---|
| Example 25 | $3*10^{10}$ | $4*10^{10}$ |
| Example 26 | $8*10^{10}$ | $9*10^{10}$ |
| Example 27 | $5*10^{8}$ | $7*10^{8}$ |
| Example 28 | $3*10^{8}$ | $5*10^{8}$ |
| Example 29 | $4*10^{9}$ | $5*10^{9}$ |
| Example 30 | $6*10^{9}$ | $7*10^{9}$ |
| Example 31 | $6*10^{8}$ | $2*10^{9}$ |
| Example 32 | $4*10^{9}$ | $7*10^{9}$ |
| Example 33 | $3*10^{7}$ | $5*10^{7}$ |
| Example 34 | $1*10^{6}$ | $2*10^{6}$ |
| Example 35 | $5*10^{8}$ | $7*10^{8}$ |
| Example 36 | $8*10^{9}$ | $1*10^{9}$ |
| Comparative example 6 | $5*10^{14}$ | $6*10^{14}$ |
| Comparative example 7 | $3*10^{13}$ | $6*10^{13}$ |
| Comparative example 8 | $4*10^{13}$ | $4*10^{13}$ |

As shown in Table 3, the silicone rubbers prepared in Examples 25 to 36 are all antistatic rubbers, while the silicone rubbers prepared in Comparative examples 6 to 8 have poor antistatic properties.

The technical features of the above-mentioned embodiments can be combined. In order to make the description concise, the present disclosure does not provide all possible combinations of the various technical features in the above-mentioned embodiments. However, as long as the technical features in the combination are not contradictory to each other, such a combination should be regarded as within the scope of the present disclosure.

It should be noted that above preferred embodiments of the present disclosure are explanatory, and shall not be construed to limit the present disclosure. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. Therefore, the scope claimed by the present disclosure shall be subject to the appended claims.

What is claimed is:

1. A method for surface treatment of a silicone rubber, comprising:
   providing the silicone rubber bearing a polar group on a surface of the silicone rubber, and
   applying a multifunctional compound to the surface of the silicone rubber bearing the polar group to allow the multifunctional compound to react with the polar group to form a coating,
wherein the polar group comprises a hydroxyl group and the multifunctional compound is a cationic silane coupling agent having the following structure:

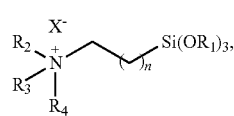
(1)

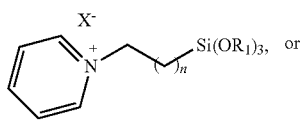
(2)

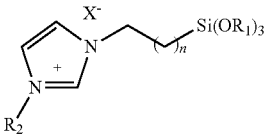
(3)

wherein
   $R_1$ is methyl, ethyl, propyl or isopropyl,
   $R_2$, $R_3$ and $R_4$ are each independently $C_1$-$C_{16}$ alkyl, aromatic hydrocarbyl, $\alpha$-alkenyl, or methacryloyloxy hydrocarbyl,
   $X^-$ is a halide ion, a carboxylate ion, a nitrate ion, a boron tetrafluoride ion, a phosphorus hexafluoride ion, a sulphate ion, or a bis(trifluoromethanesulfonyl)imide ion, and
   n is an integer in a range of 0 to 3.

2. The method according to claim 1, further comprising:
   applying a hydrophilic compound to the surface of the silicone rubber bearing the polar group to allow the cationic silane coupling agent to react with the polar group and the hydrophilic compound simultaneously.

3. The method according to claim 2, wherein the hydrophilic compound comprises at least one of a hydrophilic monomer and a hydrophilic polymer.

4. The method according to claim 3, wherein the hydrophilic monomer comprises at least one of acrylic acids and acrylates, methacrylic acids and methacrylates, acrylamides, methacrylamides, hydroxyethyl acrylate, hydroxyethyl methacrylate, maleic acids and maleates, fumaric acids and fumarates, and a vinyl-terminated polyethylene glycol homopolymer or copolymer, and
   the hydrophilic polymer is a hydroxyl-containing hydrophilic polymer, comprising at least one of polyvinyl alcohol, a polyethylene glycol homopolymer or copolymer, polyhydroxyethyl acrylate, polyhydroxypropyl acrylate, poly(hydroxyethyl acrylate-co-acrylic acid), poly(hydroxyethyl acrylate-co-acrylamide), poly(hydroxyethyl acrylate-co-maleic anhydride), poly(hydroxyethyl acrylate-co-dimethylaminoethyl (meth)acrylate), poly(hydroxyethyl acrylate-co-acryloxyethyl trimethylammonium chloride), poly(hydroxypropyl acrylate-co-acrylic acid), poly(hydroxypropyl acrylate-co-acrylamide), poly(hydroxypropyl acrylate-co-maleic anhydride), poly(hydroxypropyl acrylate-co-dimethylaminoethyl (meth)acrylate), poly(hydroxypropyl acrylate-co-acryloxyethyl trimethylammonium chloride), starch, gelatin, and hydroxyethyl cellulose.

5. The method according to claim 2, wherein a mass ratio of the cationic silane coupling agent to the hydrophilic compound is in a range of 5:1 to 1:5.

6. The method according to claim 1, wherein after the coating is formed, the silicone rubber is kept at a temperature of 20° C. to 150° C. for 1 min to 60 min.

7. The method according to claim 1, wherein after the coating is formed, the method further comprises:
   applying an adhesive agent on a surface of the coating to allow the adhesive agent to react with the multifunctional compound to form a second coating, and
   curing the coating and the second coating layer sequentially applied to the surface of the silicone rubber.

8. The method according to claim 7, wherein the adhesive agent comprises a polymer or a monomer for synthesizing the polymer.

9. The method according to claim 8, wherein the polymer comprises at least one of polyurethanes, epoxy resin, and polyacrylates.

10. The method according to claim 7, wherein when the adhesive agent is applied to the surface of the coating, the method further comprises:
applying an antistatic agent to the surface of the coating so that the antistatic agent is contained in the second coating.

11. The method according to claim 10, wherein the antistatic agent comprises at least one of a surfactant and a hydrophilic polymer.

12. The method according to claim 11, wherein the surfactant comprises at least one of a cationic surfactant, an anionic surfactant, an amphoteric surfactant and a nonionic surfactant, wherein
the cationic surfactant comprises at least one of a quaternary ammonium salt surfactant, a morpholine hydrochloride surfactant and an imidazoline surfactant;
the anionic surfactant comprises at least one of a sulfonate surfactant, a phosphate surfactant and a carboxylate surfactant;
the nonionic surfactant comprises at least one of a surfactant containing a polyoxyethylene moiety and a surfactant containing a polyol.

13. The method according to claim 12, wherein the hydrophilic polymer comprises at least one of polyvinyl alcohol, a polyethylene glycol homopolymer or copolymer, polyacrylamides, polyhydroxyethyl acrylate, polyhydroxypropyl acrylate, polyacrylic acids and polyacrylates, polyacryloxyethyl trimethylammonium chloride, polydimethylaminoethyl (meth)acrylate, a maleic anhydride copolymer, a maleic copolymer, a fumaric copolymer, starch, gelatin and hydroxyethyl cellulose.

14. The method according to claim 1, wherein the surface of the silicone rubber is treated so that the silicone rubber bears the polar group.

15. The method according to claim 14, wherein the surface of the silicone rubber is treated by an ultraviolet light irradiation treatment or a plasma surface treatment, wherein the ultraviolet light irradiation treatment is performed in an ozone atmosphere, the plasma surface treatment is performed in an oxygen atmosphere.

16. The method according to claim 15, wherein the ultraviolet light used in the ultraviolet light irradiation treatment has a wavelength of 100 nm to 300 nm, and/or the ultraviolet light irradiation treatment is performed at a temperature of 20° C. to 200° C. for a period of 1 min to 120 min.

17. The method according to claim 15, wherein the plasma surface treatment is performed at a temperature of 20° C. to 200° C. for a period of 1 min to 120 min.

* * * * *